US009971030B2

(12) United States Patent
Jung et al.

(10) Patent No.: US 9,971,030 B2
(45) Date of Patent: May 15, 2018

(54) METHOD AND APPARATUS FOR CORRECTING IONIC DISTORTION OF SATELLITE RADAR INTERFEROGRAM

(71) Applicants: University of Seoul Industry Cooperation Foundation, Seoul (KR); Republic of Korea (National Disaster Management Institute), Seoul (KR)

(72) Inventors: Hyung Sup Jung, Seoul (KR); Dong Taek Lee, Gyeonggi-Do (KR); Zhong Lu, Vancouver, WA (US); Joong Sun Won, Gyeonggi-Do (KR); Young Jin Park, Seoul (KR); Jae Won Choi, Seoul (KR); Shin Hoi Goo, Seou (KR)

(73) Assignees: University of Seoul Industry Cooperation Foundation, Seoul (KR); Republic of Korea (National Disaster Management Institute), Seoul (KR)

( * ) Notice: Subject to any disclaimer, the term of this patent is extended or adjusted under 35 U.S.C. 154(b) by 322 days.

(21) Appl. No.: 14/754,291

(22) Filed: Jun. 29, 2015

(65) Prior Publication Data
US 2015/0369913 A1 Dec. 24, 2015

Related U.S. Application Data

(63) Continuation of application No. PCT/KR2013/009273, filed on Oct. 17, 2013.

(30) Foreign Application Priority Data
Dec. 28, 2012 (KR) ........................ 10-2012-0156644

(51) Int. Cl.
*G01S 13/90* (2006.01)

(52) U.S. Cl.
CPC ................................ *G01S 13/9023* (2013.01)

(58) Field of Classification Search
CPC ................................................... G01S 13/9023
(Continued)

(56) References Cited

U.S. PATENT DOCUMENTS 7,840,351 B2  11/2010  Hwang et al.
2012/0092213 A1*  4/2012  Chen ..................... G01S 19/32
                                                 342/26 A

FOREIGN PATENT DOCUMENTS

KR  10-2006-0040214 A  5/2006
KR  10-2010-0084022 A  7/2010
(Continued)

OTHER PUBLICATIONS

Lee, Dong Taek, Ionospheric Effect Correction of SAR Interferogram using Multiple Aperture SAR Interferometry (MAI), Univ. Seoul Masters Thesis (Feb. 29, 2012) English Abstract, pp. 1-91.

*Primary Examiner* — Timothy A Brainard
(74) *Attorney, Agent, or Firm* — Mintz Levin Cohn Ferris Glovsky and Popeo, P.C.; Kongsik Kim; Jonathon Western

(57) ABSTRACT

An apparatus and method for correcting the ionospheric distortion of an SAR (Synthetic Aperture Radar) interferogram are disclosed herein. The apparatus includes a multiple aperture SAR interferometry (MAI) interferogram generation unit, a transformed MAI interferogram generation unit, an ionospheric distortion interferogram generation unit, and a corrected SAR interferogram acquisition unit. The multiple aperture SAR interferometry (MAI) interferogram generation unit generates a multiple aperture SAR interferometry (MAI) interferogram using an SAR interferogram. The transformed MAI interferogram generation unit generates a transformed MAI interferogram representative of the azimuth direction derivatives of ionospheric distortion phases using the phases of the MAI interferogram. The ionospheric
(Continued)

distortion interferogram generation unit generates an ionospheric distortion interferogram using the transformed MAI interferogram. The corrected SAR interferogram acquisition unit acquires a corrected SAR interferogram by eliminating the generated ionospheric distortion interferogram from the SAR interferogram.

15 Claims, 12 Drawing Sheets

(58) Field of Classification Search
USPC .................................................. 342/25 C
See application file for complete search history.

(56) References Cited

FOREIGN PATENT DOCUMENTS

| KR | 10-2011-0048925 A | 5/2011 |
| KR | 10-2011-0060626 A | 6/2011 |
| KR | 10-1111689 B1 | 2/2012 |

* cited by examiner

METHOD AND APPARATUS FOR CORRECTING IONIC DISTORTION OF SATELLITE RADAR INTERFEROGRAM

CROSS-REFERENCE TO RELATED APPLICATION

This application is a continuation of PCT/KR2013/009273 filed on Oct. 17, 2013, which claims priority to Korean Application No. 10-2012-0156644 filed Dec. 28, 2012, which applications are incorporated herein by reference.

TECHNICAL FIELD

The present invention relates to a method and apparatus for correcting the ionospheric distortion of an SAR interferogram and, more particularly, to a method and apparatus for more effectively eliminating an ionospheric distortion phenomenon appearing in a satellite radar image using a linear relationship between the ionospheric distortion phases of an SAR interferogram and the phases of an multiple aperture synthetic aperture radar (SAR) interferometry (MAI) interferogram.

BACKGROUND ART

The recently developed Interferometric Synthetic Aperture Radar (InSAR) is technology that has been successfully used to two-dimensionally observe ground surface displacement within a broad area of a few tens of km² or broader with a measurement sensitivity ranging from a few centimeters to a few millimeters.

For past 15 years, InSAR has been used to observe earthquakes, volcanos, glaciers, landslides, groundwater pumping, the subsidence of reclaimed land, the subsidence of abandoned mines, etc. The data generated by InSAR is called a radar interferogram. Precise ground surface displacement can be observed from such a radar interferogram in the line-of-sight (LOS) of an antenna.

However, this technology can observe only one-dimensional ground surface displacement in the direction of observation, and thus has a limitation in terms of the three-dimensional analysis of the mechanism of ground surface displacement in the case of seismic activity, volcanic eruption, a landslide, the movement of a glacier, or the like. Accordingly, many researchers have actively conducted research for two- or three-dimensional ground surface displacement in order to overcome the above disadvantage.

As an example, a method of determining ground surface displacements in a ground range direction and in a direction vertical with respect to a ground surface from a plurality of images having different paths using InSAR is known. However, this has the disadvantage of being unable to observe ground surface displacement in a direction of flight.

Furthermore, a method using a correlation coefficient between two images or various images was proposed, and has been widely used to observe three-dimensional ground surface displacement. However, since the accuracy of measured ground surface displacement is very low, this method can be applied only to a ground surface displacement of tens of cm or longer.

In contrast, MAI (multiple aperture SAR interferometry), recently developed and designed to improve the observational accuracy of ground surface displacement in a direction of flight, generates a forward-looking interferogram and a backward-looking interferogram through split-beam InSAR processing and generates an MAI interferogram from these two different interferograms. This method exhibits significantly higher accuracy than the method using a correlation coefficient. It is known that when an ERS SAR satellite image is used, it is possible to observe ground surface displacement in a direction of flight with an accuracy of about 8 cm at a coherence of 0.6. Furthermore, it is known that when an ALOS PALSAR satellite image is used, it is possible to observe 3D ground surface displacement in the east and in a vertical direction with an accuracy of about 2 cm and in the north with an accuracy of about 4 cm or lower.

Accordingly, Korean Patent 10-1111689 entitled "Method and Apparatus for Extracting 3D Ground Surface Displacement" proposes a technology that extracts a ground surface displacement in an LOS direction and a ground surface displacement in a direction of flight using an SAR interferogram and an MAI interferogram and extracts a 3D ground surface displacement from these ground surface displacements.

However, this related technology has the advantage of being able to observe accurate ground surface displacement using an SAR interferogram, but has a disadvantage in that an SAR interferogram may occasionally involve serious distortion, such as a striped pattern effect, due to an ionospheric change. That is, although this related technology proposes an attempt to increase accuracy by eliminating flat-earth phase, altitude phase, and residual phase attributable to matching error in the step of generating MAI data, this related technology cannot fundamentally overcome a distortion effect attributable to an ionospheric change.

Although such distortion appearing in an SAR interferogram should be corrected, a method capable of efficiently eliminating ionospheric distortion has not been developed yet because of the occurrence of a precision-related problem.

Therefore, there is a demand for a method that is capable of fulfilling accuracy while correcting an ionospheric distortion phenomenon that appears in an SAR interferogram.

SUMMARY OF THE DISCLOSURE

Accordingly, the present invention has been made keeping in mind the above problems occurring in the prior art, and an object of the present invention is to observe precise ground surface displacement using an SAR interferogram.

Another object of the present invention is to correct an ionospheric distortion phenomenon that appears in an SAR interferogram due to a change in the ionosphere of the earth.

Still another object of the present invention is to solve a problem in which the ionospheric distortion of an SAR interferogram cannot be eliminated for a precision-related reason.

Yet another object of the present invention is to utilize an SAR interferogram, in which an ionospheric distortion phenomenon has been corrected, in the various fields of observation for disaster prevention, such as the observation of ground surface displacement attributable to an earthquake or a volcano, the observation of a landslide, the observation of the heights of trees, the observation of land subsidence, etc.

In accordance with an aspect of the present invention, there is provided a method of correcting the ionospheric distortion of an SAR (Synthetic Aperture Radar) interferogram, including: generating a multiple aperture SAR interferometry (MAI) interferogram using an SAR interferogram; generating a transformed MAI interferogram representative of the azimuth direction derivatives of ionospheric distortion phases using the phases of the MAI interferogram; generating an ionospheric distortion interferogram using the transformed MAI interferogram; and acquiring a corrected SAR interferogram by eliminating the generated ionospheric distortion interferogram from the SAR interferogram.

The method may further include, after the generating of the MAI interferogram, registering the location of the SAR interferogram with the location of the MAI interferogram. The generating of the transformed MAI interferogram may include generating the phases of the MAI interferogram using the azimuth direction derivatives of the phases of the SAR interferogram.

The generating of the MAI interferogram may include generating the MAI interferogram using phase differences between the forward-looking interferogram and the backward-looking radar interferogram of the SAR interferogram.

The generating of the MAI interferogram may include: generating a forward-looking SAR image by compressing data obtained by an SAR sensor imaging a single target from a front view of a center of a beam; generating a backward-looking SAR image by compressing data obtained by the SAR sensor imaging the single target from a backward view of the center of the beam; generating the forward-looking radar interferogram from phase differences calculated after observing the forward-looking SAR image twice; and generating the backward-looking radar interferogram from phase differences calculated after observing the backward-looking SAR image twice.

The generating of the ionospheric distortion interferogram may include generating the ionospheric distortion interferogram by integrating the transformed MAI interferogram along an azimuth direction.

The generating of the ionospheric distortion interferogram may include: generating an initial ionospheric distortion interferogram on the assumption that an integral constant is 0; generating an error interferogram from differences between the SAR interferogram and the initial ionospheric distortion interferogram; obtaining an average of the error interferogram in the azimuth direction, and calculating an initial integral constant along a range direction; finding a discontinuous location from the initial integral constant, and calculating a correction integral constant; and adding the correction integral constant to the initial ionospheric distortion interferogram.

The generating of the ionospheric distortion interferogram may include performing integration using an integral constant determined on the assumption that there is the correlation between the SAR interferogram and the ionospheric distortion interferogram.

In accordance with still another aspect of the present invention, there is provided an apparatus for correcting the ionospheric distortion of an SAR (Synthetic Aperture Radar) interferogram, including: a multiple aperture SAR interferometry (MAI) interferogram generation unit configured to generate a multiple aperture SAR interferometry (MAI) interferogram using an SAR interferogram; a transformed MAI interferogram generation unit configured to generate a transformed MAI interferogram representative of the azimuth direction derivatives of ionospheric distortion phases using the phases of the MAI interferogram; an ionospheric distortion interferogram generation unit configured to generate an ionospheric distortion interferogram using the transformed MAI interferogram; and a corrected SAR interferogram acquisition unit configured to acquire a corrected SAR interferogram by eliminating the generated ionospheric distortion interferogram from the SAR interferogram.

The apparatus may further include an MAI interferogram registration unit configured to register or match a location of the SAR interferogram with a location of the MAI interferogram; and the transformed MAI interferogram generation unit may be further configured to generate the phases of the MAI interferogram using the azimuth direction derivatives of the phases of the SAR interferogram.

The apparatus may further include an SAR interferogram generation unit configured to generate a forward-looking radar interferogram and a backward-looking radar interferogram; and the MAI interferogram generation unit may be further configured to generate the MAI interferogram using phase differences between the forward-looking interferogram and the backward-looking radar interferogram generated by the SAR interferogram generation unit.

The SAR interferogram generation unit may include a forward-looking radar interferogram generation unit configured to generate a forward-looking SAR image by compressing data obtained by an SAR sensor imaging a single target from a front view of a center of a beam; generate the forward-looking radar interferogram generated from phase differences calculated after observing the forward-looking SAR image twice.

The SAR interferogram generation unit may include a backward-looking radar interferogram generation unit configured to generate a backward-looking SAR image by compressing data obtained by the SAR sensor imaging the single target from a backward view of the center of the beam; and generating the backward-looking radar interferogram from phase differences calculated after observing the backward-looking SAR image twice.

The ionospheric distortion interferogram generation unit may be further configured to generate the ionospheric distortion interferogram by integrating the transformed MAI interferogram along an azimuth direction.

The ionospheric distortion interferogram generation unit may be further configured to: generate an initial ionospheric distortion interferogram on the assumption that an integral constant is 0; generate an error interferogram from differences between the SAR interferogram and the initial ionospheric distortion interferogram; obtain an average of the error interferogram in the azimuth direction, and calculate an initial integral constant along a range direction; find a discontinuous location from the initial integral constant, and calculate a correction integral constant; and add the correction integral constant to the initial ionospheric distortion interferogram, thereby generating the ionospheric distortion interferogram.

The ionospheric distortion interferogram generation unit may be further configured to perform integration using an integral constant determined on the assumption that there is the correlation between the SAR interferogram and the ionospheric distortion interferogram.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

Terms and words that are used in the present specification and the claims should not be restrictively interpreted as having common and dictionary meanings, but should be interpreted as having meanings and concepts in conformity with the technical spirit of the present invention based on the principle in which an inventor can appropriately define the concepts of terms in order to describe his or her invention in the best way.

Accordingly, the embodiments described in the present specification and the configurations illustrated in drawings are merely preferred embodiments of the present invention and do not represent all the technical spirit of the present invention, it should be understood that there may be various equivalents and modifications that may replace the embodiments and the configurations at the time at which the present application is filed.

The terms used herein are merely intended to describe specific embodiments and not to limit the present invention. Unless otherwise stated, the singular expression includes a plural expression. In this application, the terms "include" or "have" are used to designate the presence of one or more features, numbers, steps, operations, components, parts or combinations thereof described in the specification, and should not be understood as excluding the presence or probability of addition of one or more different features, numbers, steps, operations, components, parts or combinations thereof.

First, the general characteristics of MAI (multiple aperture SAR interferometry) addressed by the present invention are defined. MAI is a technique that is recently developed and designed to improve the observational accuracy of ground surface displacement in a direction of flight, and functions to generate a forward-looking interferogram and a backward-looking interferogram through split-beam InSAR processing and generate an MAI interferogram from these two different interferograms. This method exhibits significantly higher accuracy than the method using a correlation coefficient. It is known that when an ERS SAR satellite image is used, it is possible to observe ground surface displacement in a direction of flight with an accuracy of about 8 cm at a coherence of 0.6. Furthermore, it is known that when an ALOS PALSAR satellite image is used, it is possible to observe 3D ground surface displacement in the east and in a vertical direction with an accuracy of about 2 cm and in the north with an accuracy of about 4 cm or lower.

Hereinafter, embodiments of the present invention will be described in greater detail with reference to the accompanying drawings.

Figure 1:
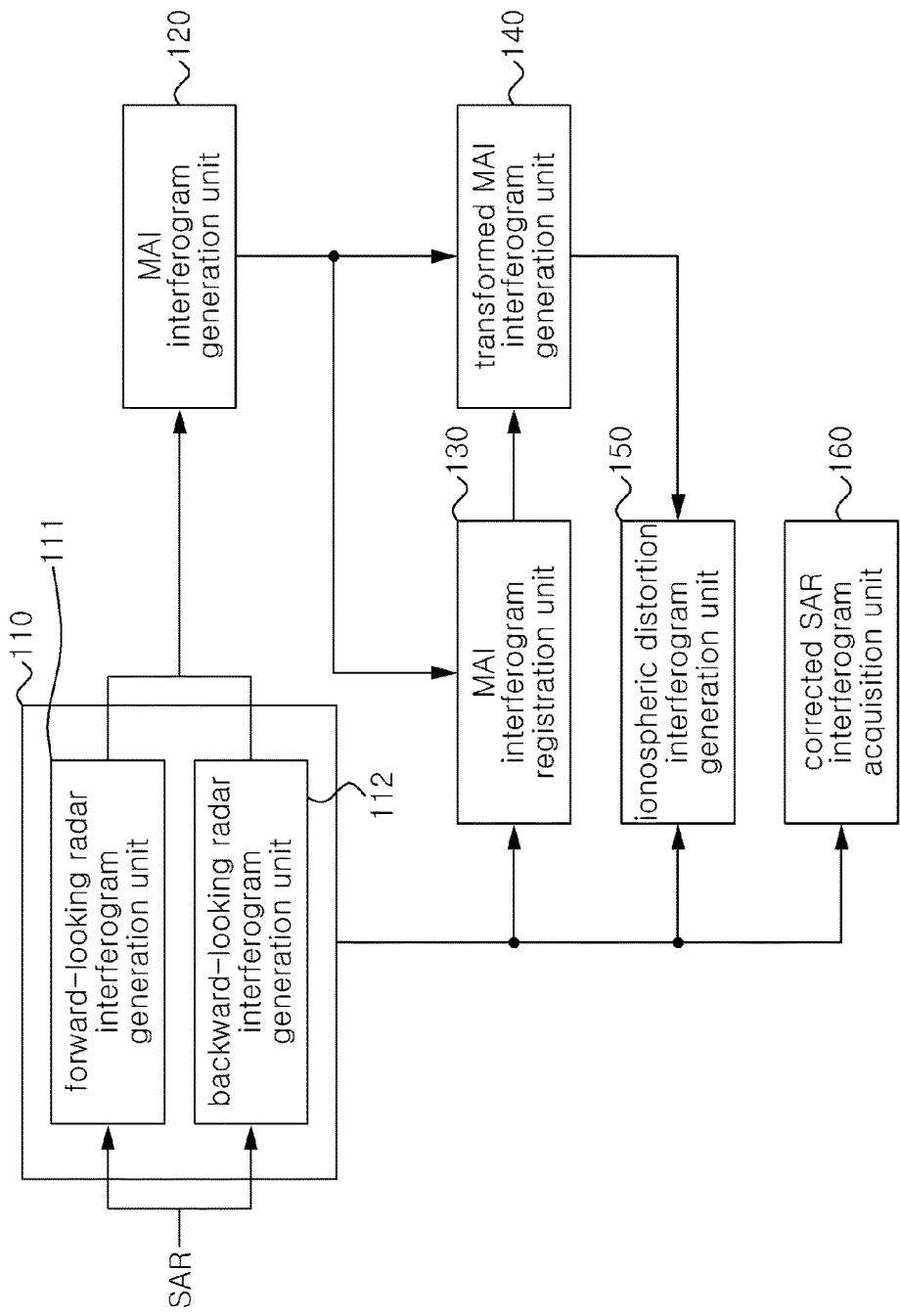
FIG. 1 is a schematic block diagram illustrating an apparatus for correcting the ionospheric distortion of an SAR interferogram according to an embodiment of the present invention.

FIG. 1 is a schematic block diagram illustrating an apparatus for correcting the ionospheric distortion of an SAR interferogram according to an embodiment of the present invention.

The apparatus for correcting the ionospheric distortion of an SAR interferogram according to the present embodiment may be implemented as a computer system which comprises a processor (not shown) therein. The processor includes an SAR interferogram generation unit 110, an MAI interferogram generation unit 120, an MAI interferogram registration unit 130, a transformed MAI interferogram generation unit 140, an ionospheric distortion interferogram generation unit 150, and a corrected SAR interferogram acquisition unit 160.

The SAR interferogram generation unit 110 includes a forward-looking radar interferogram generation unit 111 and a backward-looking radar interferogram generation unit 112.

Before addressing details of embodiments described below, some terms are defined or clarified. A Synthetic Aperture Radar (SAR) image is a high-resolution radar image that is generated by imaging a single target a few thousand times in such a way that a sensor emits and receives microwaves and then compressing photographed data. An SAR image is composed of complex numbers each having magnitude and phase. The magnitude refers to ground surface reflectance, and the phase refers to an object represented by a single period of a sign or cosign curve. A SAR interferogram is data that is generated from the phase differences between SAR images acquired by observing an SAR image twice. A method of generating such an SAR interferogram is a technology that is well known in the technical field to which the present invention pertains.

Accordingly, the forward-looking radar interferogram generation unit 111 generates a forward-looking SAR image by compressing only data corresponding to the number of times observation is performed from the front of the center of a beam selected from the number of times an SAR sensor photographs a single target, and generates a forward-looking radar interferogram from phase differences calculated by observing such forward-looking SAR images twice.

In the same manner as the forward-looking radar interferogram is generated, the backward-looking radar interferogram generation unit 112 generates a backward-looking SAR image by compressing only data corresponding to the number of times observation is performed from the back of the center of a beam selected from the number of times an SAR sensor photographs a single target, and generates a backward-looking radar interferogram from phase differences calculated by observing such a backward-looking SAR image twice.

The MAI interferogram generation unit 120 generates an MAI interferogram by calculating the phase differences between the forward-looking radar interferogram generated by the forward-looking radar interferogram generation unit 111 and the backward-looking radar interferogram generated by the backward-looking radar interferogram generation unit 1120. Such an MAI interferogram is used to observe ground surface displacement in a direction of flight or the speed of an object. For a detailed description of the generation of an MAI interferogram, see Korean Patent No. 10-1111689, which is a well-known technology.

The MAI interferogram registration unit 130 matches the location of the SAR interferogram with the location of the MAI interferogram using the location of the SAR interferogram. This is performed by an area-based matching technique. Since this technique is well known in the technical field to which the present invention pertains, a description thereof is omitted.

The transformed MAI interferogram generation unit 140 transforms the phases of the MAI interferogram into the phases of the transformed MAI interferogram using the azimuth direction derivatives of the phases of the SAR interferogram. The transformed MAI interferogram refers to the azimuth direction derivatives of ionospheric distortion phases, and will be described in conjunction with an equation when it is described in greater detail with reference to the flow diagram of FIG. 2.

The ionospheric distortion interferogram generation unit 150 generates the ionospheric distortion interferogram by integrating the transformed MAI interferogram, generated by the transformed MAI interferogram generation unit 140, along an azimuth direction. The ionospheric distortion interferogram refers to an SAR interferogram having only an ionospheric distortion phase, and will be described in conjunction with an equation when it is described in greater detail with reference to the flow diagram of FIG. 2.

The corrected SAR interferogram acquisition unit 160 acquires a corrected SAR interferogram by eliminating the generated ionospheric distortion interferogram from the SAR interferogram.

Figure 2:
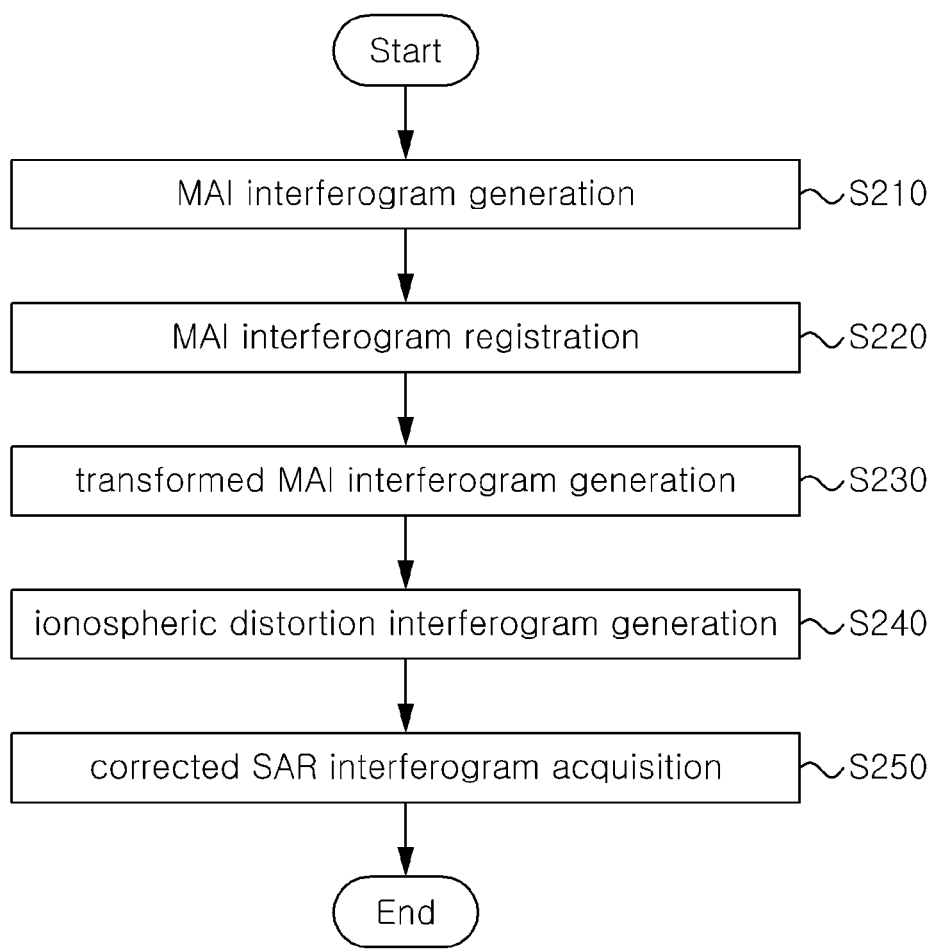
FIG. 2 is a flow diagram illustrating the overall flow of a method of correcting the ionospheric distortion of an SAR interferogram according to an embodiment of the present invention.

FIG. 2 is a flow diagram illustrating the overall flow of a method of correcting the ionospheric distortion of an SAR interferogram according to an embodiment of the present invention. The individual steps of the method are described in detail with reference to the accompanying drawing. For ease of description, the following description is given with numbers assigned thereto.

1. MAI Interferogram Generation Step <S210>

At step 210, an MAI interferogram is generated from a forward-looking radar interferogram and a backward-looking radar interferogram.

An SAR image is a high-resolution radar image that is generated by imaging a single target a few thousand times in such a way that a sensor emits and receives microwaves and then compressing photographed data. An SAR image is composed of complex numbers each having magnitude and phase. The magnitude refers to ground surface reflectance, and the phase refers to an object represented by a single period of a sign or cosign curve.

A SAR interferogram is data that is generated from the phase differences between SAR images acquired by observing an SAR image twice. A method of generating such an SAR interferogram is a technology that is well known in the technical field to which the present invention pertains.

Accordingly, a forward-looking radar interferogram is generated in such a way that the forward-looking radar interferogram generation unit 111 generates a forward-looking SAR image by compressing only data corresponding to the number of times observation is performed from the front of the center of a beam selected from the number of times an SAR sensor photographs a single target and then generates the forward-looking radar interferogram from phase differences calculated by observing such forward-looking SAR images twice. In contrast, a backward-looking radar interferogram is generated in such a way that the backward-looking radar interferogram generation unit 112 generates a backward-looking SAR image by compressing only data corresponding to the number of times observation is performed from the back of the center of a beam selected from the number of times an SAR sensor photographs a single target and then generates the backward-looking radar interferogram from phase differences calculated by observing such a backward-looking SAR image twice.

An MAI interferogram is generated by calculating the phase differences between the forward-looking radar interferogram and the backward-looking radar interferogram, and is used to observe ground surface displacement in a direction of flight or the speed of an object. For a detailed description of the generation of an MAI interferogram, see Korean Patent No. 10-1111689, which is a well-known technology.

2. MAI interferogram Registration Step <S220>

At step S220, the MAI interferogram registration unit 130 matches the SAR interferogram with the MAI interferogram. This registration (matching) performs the task of adjusting the location of the MAI interferogram using the location of the SAR interferogram, and is performed by an area-based matching technique. Since this technique is well known in the technical field to which the present invention pertains, a description thereof is omitted.

3. Transformed MAI Interferogram Generation Step <S230>

At step S230, a transformed MAI interferogram representative of the azimuth direction derivatives of the ionospheric distortion phases is generated using the phases of the MAI interferogram. In other words, at step S230, the transformed MAI interferogram generation unit 140 transforms the phases $\phi_{MAI}$ of the MAI interferogram into the phases $\hat{\phi}_{MAI}$ of the transformed MAI interferogram using the azimuth direction (x) derivatives $d\phi_{InSAR}/dx$ of the phases $\phi_{InSAR}$ of the SAR interferogram.

The transformed MAI interferogram refers to the azimuth direction derivatives $d\phi_{ION}/dx$ of ionospheric distortion phases. Azimuth direction derivatives with respect to ionospheric distortion phases $\phi_{ION}$ appearing in the SAR interferogram may be expressed by Equation 1 below:

$$\hat{\phi}_{MAI}(x, r) = \frac{d\phi_{ION}(x, r)}{dx} = \alpha \cdot \bar{\phi}_{MAI}(x, r) + \beta \quad (1)$$

wherein $\alpha$ and $\beta$ are unknowns, x and r are an azimuth direction and a range direction, respectively, and $\bar{\phi}_{MAI}$ is the phases of a scaled MAI interferogram and is expressed by Equation 2 below:

$$\bar{\phi}_{MAI}(x, r) = -\frac{1}{n\lambda} \cdot \phi_{MAI}(x, r) \quad (2)$$

where n is a squint adjustment parameter, $\lambda$ is radar wavelength, and l is the length of a radar sensor in a direction of flight.

The parameters $\alpha$ and $\beta$ of Equation 1 are values that should be obtained using an SAR interferogram and an MAI interferogram because values that are obtained by theoretical equations are inaccurate.

In general, an SAR interferogram includes convention layer-distorted phases, ionospheric distortion phases, ground surface displacement-related phases and ground level-related phases, and thus it cannot be assumed that an SAR interferogram has only ionospheric distortion phases.

However, only the ionospheric distortion phases of the SAR interferogram have a linear relationship with the phases of the MAI interferogram. Accordingly, when the azimuth direction derivatives of the satellite radar phases and the numbers of data of the MAI phases are large, the parameters $\alpha$ and $\beta$ may be obtained from a linear regression model between the values and the data.

Figure 3:
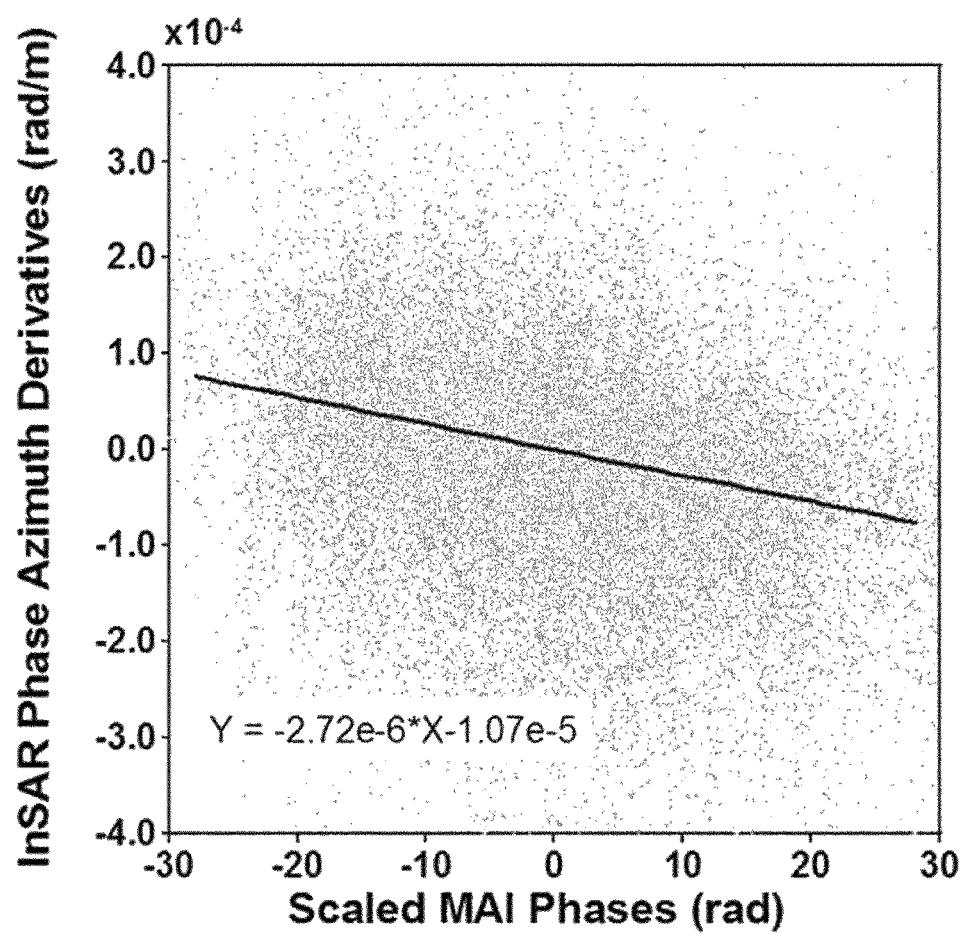
FIG. 3 is a graph illustrating the results of linear regression analysis of the phases of an SAR interferogram and the phases of an MAI interferogram according to an embodiment of the present invention.
Figure 4A:
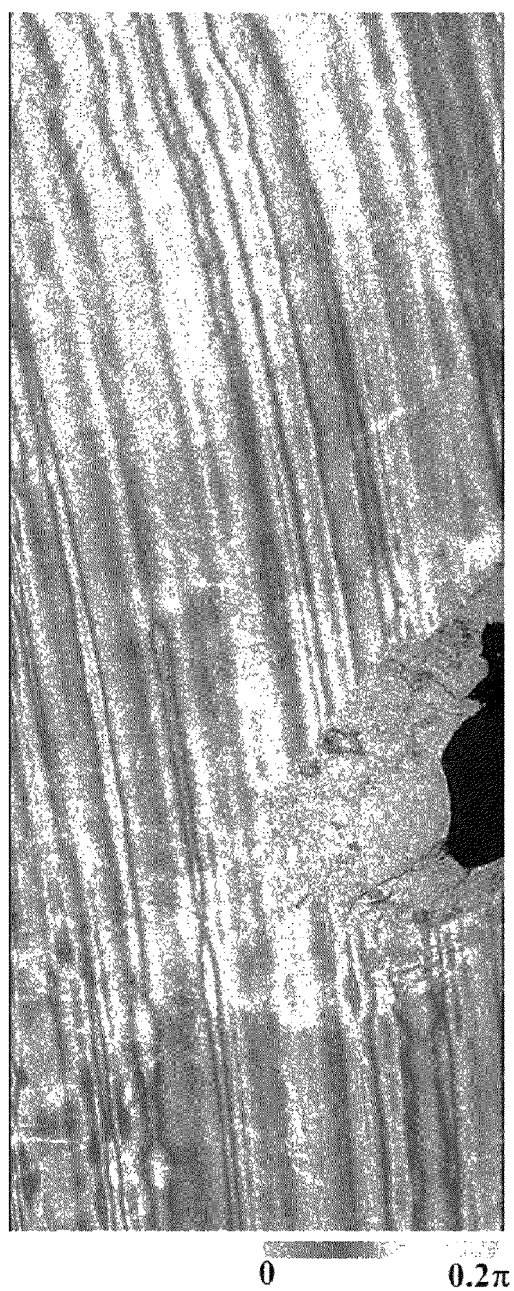
FIGS. 4A and 4B are illustrating an MAI interferogram and a transformed MAI interferogram generated by linear regression analysis according to an embodiment of the present invention.
Figure 4B:
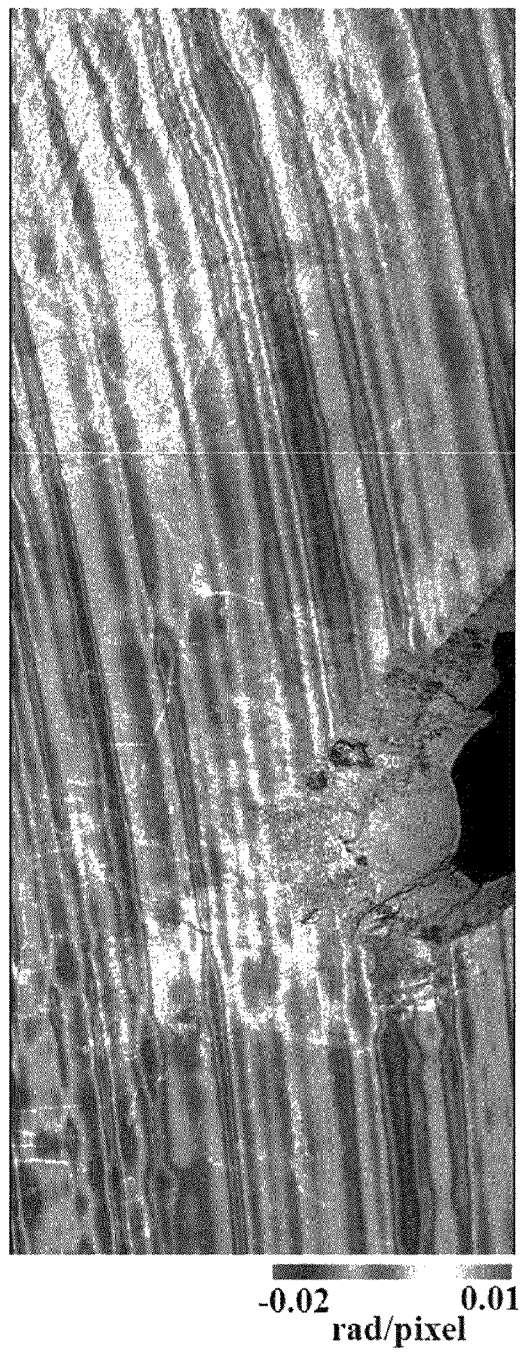

FIG. 3 illustrates the results of linear regression analysis of the phases of an SAR interferogram and the phases of an MAI interferogram generated from ALOS PALSAR image according to an embodiment of the present invention. The horizontal axis of FIG. 3 represents the phases of the scaled MAI interferogram, and the vertical axis thereof represents the azimuth direction derivatives of the phases of the SAR interferogram. As the results of the linear regression analysis, $\alpha$ is determined to be $-2.72\times10^{-6}$, and $\beta$ is determined to be $-1.07\times10^{-5}$. Using the parameters $\alpha$ and $\beta$ determined as described above, a transformed MAI interferogram is obtained from Equation 1. FIGS. 4A and 4B illustrate an MAI interferogram (FIG. 4A) and a transformed MAI interferogram (FIG. 4B) generated from an ALOS PALSAR image according to an embodiment of the present invention.

4. Ionospheric Distortion Interferogram Generation Step <S240>

At step S240, the ionospheric distortion interferogram generation unit 150 generates an ionospheric distortion interferogram by integrating the transformed MAI interferogram, generated at step S230, along the azimuth direction. In this case, the ionospheric distortion interferogram refers to an SAR interferogram having only an ionospheric distortion phase. Since the transformed MAI interferogram corresponds to the azimuth direction derivatives of the ionospheric distortion phases appearing in the SAR interferogram, the ionospheric distortion interferogram may be calculated by integrating the transformed MAI interferogram along the azimuth direction, as shown in Equation 3 below:

$$\phi_{ION}(x,r) = \int \phi_{MAI}(x,r) dx \quad (3)$$

However, the integration of the transformed MAI interferogram requires a integral constant along the range direction. The determination of the integral constant is performed on the assumption that the SAR interferogram and the ionospheric distortion interferogram have a correlation.

Accordingly, in the integration of the transformed MAI interferogram, the ionospheric distortion interferogram is generated through 1) the step of generating an initial ionospheric distortion interferogram on the assumption that a integral constant is 0, 2) the step of generating an error interferogram from the difference between the SAR interferogram and the initial ionospheric distortion interferogram, 3) the step of obtaining the average of the error interferogram along the azimuth direction and calculating an initial integral constant along the range direction, 4) the step of finding a discontinuous location from the initial integral constant and calculating a correction integral constant, and 5) the step of adding the correction integral constant to the initial ionospheric distortion interferogram.

Figure 5:
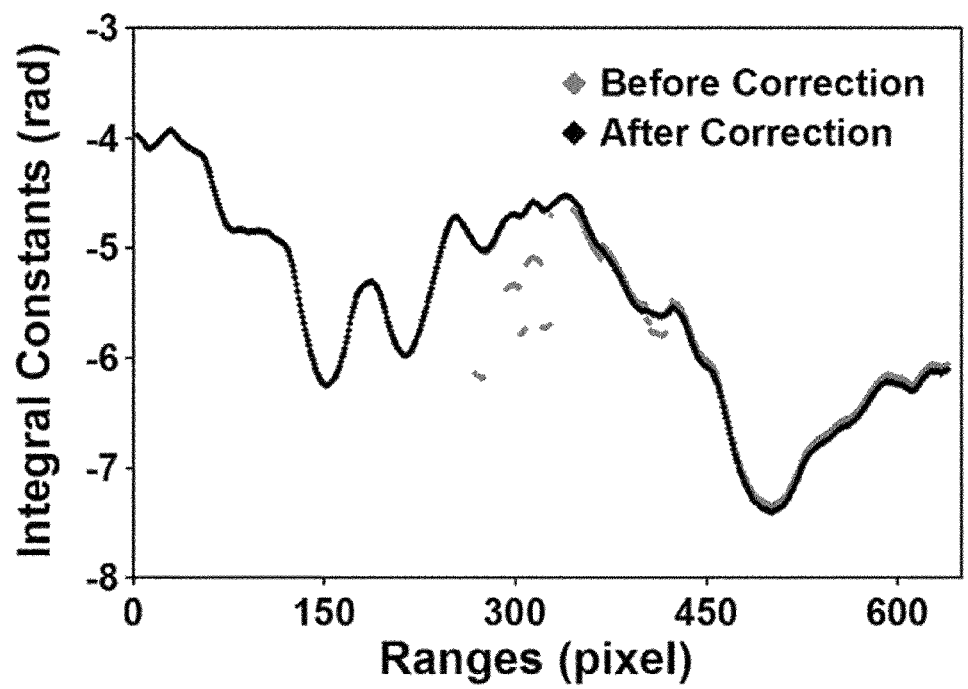
FIG. 5 is a graph showing an initial integral constant and a correction integral constant calculated from a transformed MAI interferogram according to an embodiment of the present invention.

FIG. 5 shows an initial integral constant and a correction integral constant calculated from a transformed MAI interferogram according to an embodiment of the present invention. As illustrated in FIG. 5, the initial integral constant has a discontinuous point when the correlation between an SAR interferogram and an ionospheric distortion interferogram exhibits a relatively large difference along the range direction. The correction integral constant was obtained by differentiating the initial integral constant along the range direction, finding a peak corresponding to a discontinuous point and then using data before the discontinuous point.

Figure 6:
FIG. 6 is a view showing an ionospheric distortion interferogram generated from a transformed MAI interferogram according to an embodiment of the present invention.

FIG. 6 illustrates an ionospheric distortion interferogram generated from a transformed MAI interferogram according to an embodiment of the present invention. This ionospheric distortion interferogram exhibits a striped pattern in a diagonal direction, which often appears in an SAR interferogram. If this ionospheric distortion phenomenon is not accurately eliminated, it is practically impossible to observe an accurate ground surface. Accordingly, the present invention has been devised to overcome this disadvantage.

5. Corrected SAR Interferogram Acquisition Step <S250>

At step S250, a corrected SAR interferogram is acquired by eliminating the ionospheric distortion interferogram generated by the ionospheric distortion interferogram generation unit 150 from the SAR interferogram.

In other words, since the ionospheric distortion interferogram generated at step S250 has only ionospheric distortion of various phenomena appearing in an SAR interferogram, an SAR interferogram in which the ionospheric distortion has been corrected can be acquired by the corrected SAR interferogram acquisition unit 160 when the ionospheric distortion interferogram is eliminated from the SAR interferogram.

Figure 7A:
FIGS. 7A and 7B are an SAR interferogram before the correction of ionospheric distortion phenomenon and an SAR interferogram after the correction of ionospheric distortion phenomenon, respectively, according to an embodiment of the present invention.
Figure 7B:

FIGS. 7A and 7B are an SAR interferogram before the correction of ionospheric distortion phenomenon and an SAR interferogram after the correction of ionospheric distortion phenomenon, respectively, acquired from an ALOS PALSAR image according to an embodiment of the present invention. FIG. 7A is an SAR interferogram before the correction of ionospheric distortion phenomenon. From FIG. 7A, it can be seen that the SAR interferogram has a striped pattern in a diagonal direction. FIG. 7B is an SAR interferogram after the correction of ionospheric distortion phenomenon. From FIG. 7B, it can be seen that all the striped pattern in a diagonal direction has been eliminated.

Figure 8A:
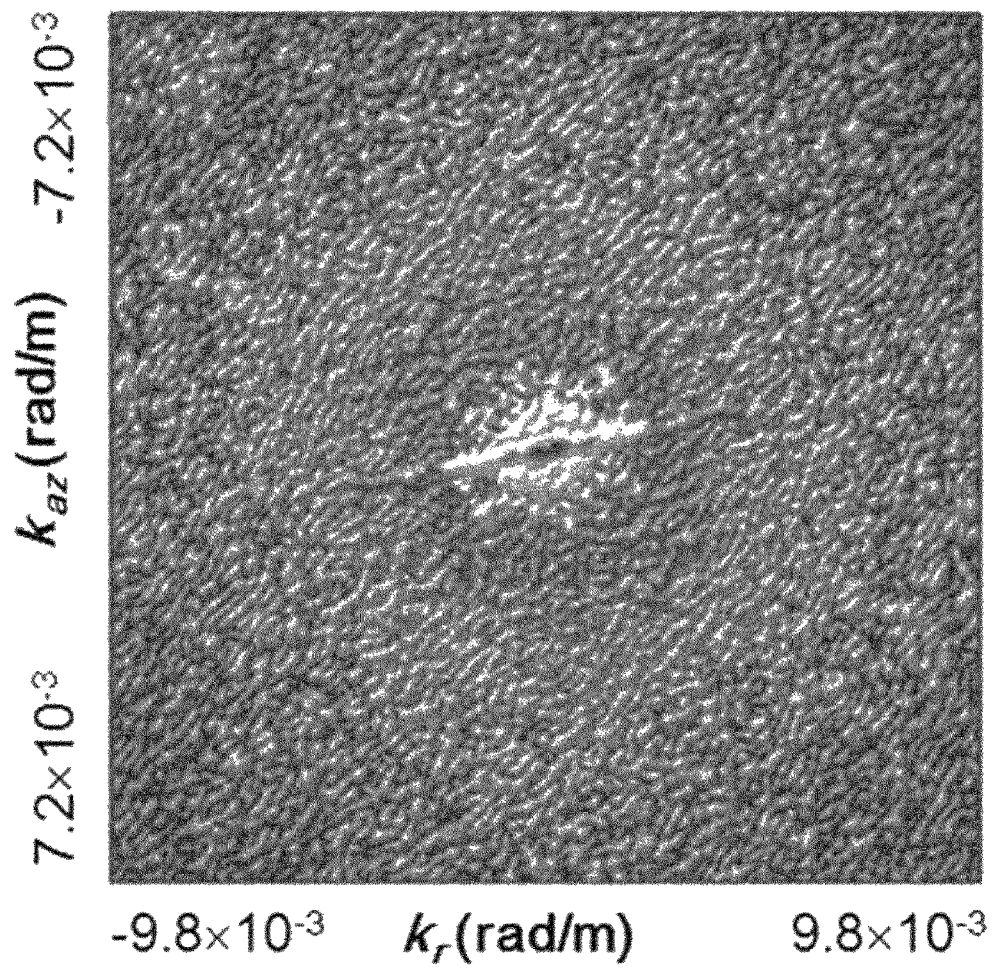
FIGS. 8A, 8B and 8C are the power spectrum of an SAR interferogram before the correction of ionospheric distortion, the power spectrum of an SAR interferogram after the correction of ionospheric distortion, and the power spectrum of an ionospheric distortion interferogram obtained through Fourier transform according to an embodiment of the present invention.
Figure 8B:
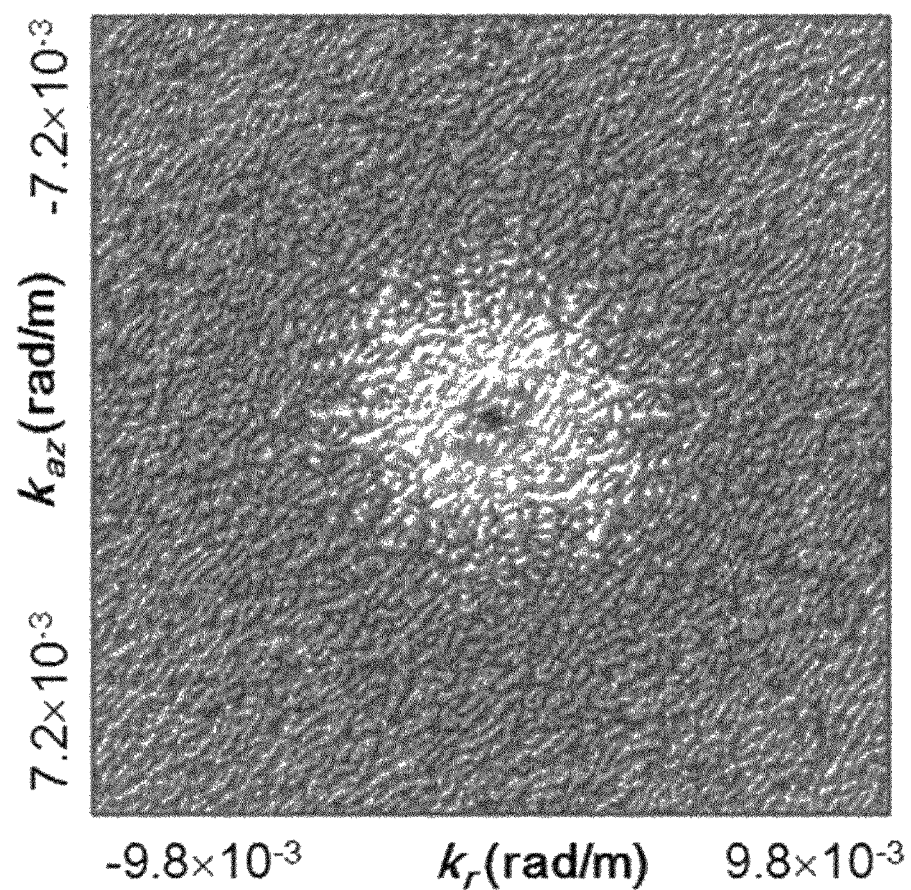
Figure 8C:
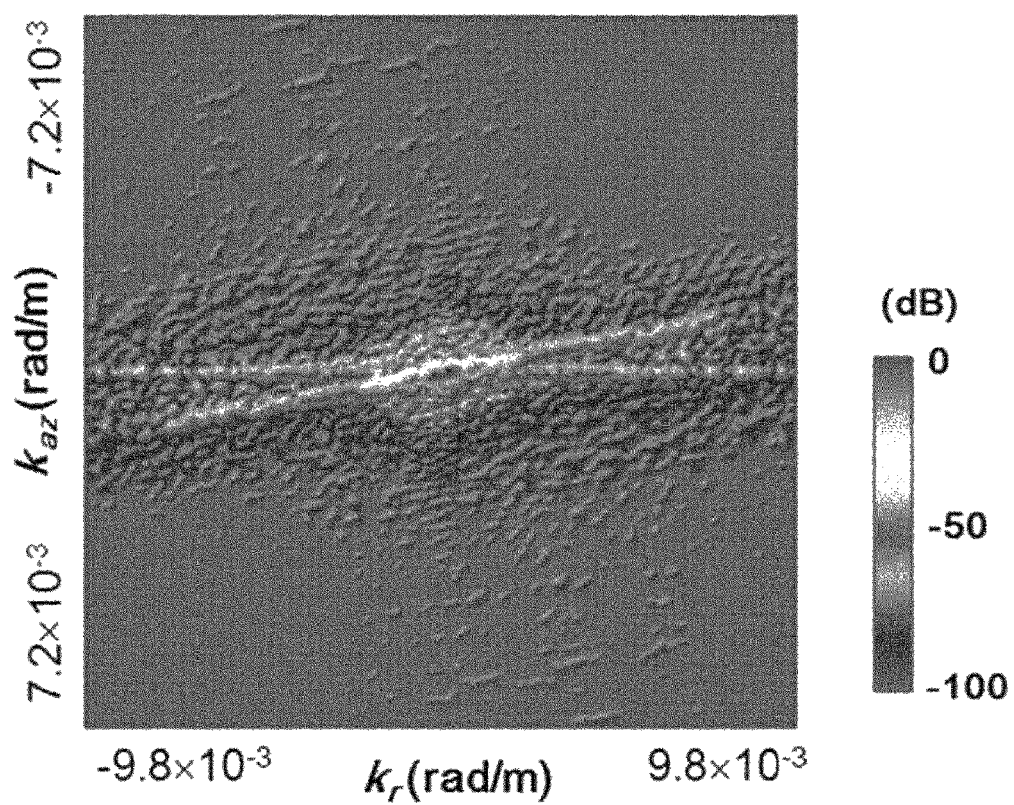

FIGS. 8A, 8B and 8C are the power spectrum of an SAR interferogram before the correction of ionospheric distortion, the power spectrum of an SAR interferogram after the correction of ionospheric distortion, and the power spectrum of an ionospheric distortion interferogram obtained through Fourier transform according to an embodiment of the present invention. FIG. 8A shows the power spectrum of an SAR interferogram before the correction of ionospheric distortion, and exhibits diagonal lines. FIG. 8B shows the power spectrum of an SAR interferogram after the correction of ionospheric distortion, and does not exhibit a diagonal line. Furthermore, FIG. 8C shows the power spectrum of an ionospheric distortion interferogram. Although from FIG. 8C, it can be seen that the power spectrum has the diagonal line appearing in the power spectrum of FIG. 8A, the horizontal line appearing in the power spectrum of FIG. 8C results from a phenomenon that appears because the integration of the transformed MAI interferogram has not been complete at step S240.

The present invention has the advantage of observing precise ground surface displacement using an SAR interferogram.

The present invention has the advantage of correcting an ionospheric distortion phenomenon that appears in an SAR interferogram due to a change in the ionosphere of the earth.

The present invention has the advantage of solving a problem in which the ionospheric distortion of an SAR interferogram cannot be eliminated for a precision-related reason.

The present invention has the advantage of correcting an ionospheric distortion phenomenon appearing in an SAR interferogram using the precise observation capability of an MAI interferogram and the relationship between the ionospheric distortion of the MAI interferogram and the ionospheric distortion of an SAR interferogram.

The present invention has the advantage of correcting ionospheric distortion that constitutes the most significant distortion of a satellite radar image, thereby improving the usability of the satellite radar image.

The present invention has the advantage of obtaining improved results by utilizing an SAR interferogram, in which an ionospheric distortion phenomenon has been corrected, in the various fields of observation for disaster prevention, such as the observation of ground surface displacement attributable to an earthquake or a volcano, the observation of a landslide, the observation of the heights of trees, the observation of land subsidence, etc.

The present invention has the advantage of contributing to the expansion of the national satellite industry and the activation of related corporations.

While the present invention has been described in conjunction with specific details, such as specific configuration elements, and limited embodiments and diagrams above, these are provided merely to help an overall understanding of the present invention, the present invention is not limited to these embodiments, and various modifications and variations can be made from the above description by those having ordinary knowledge in the art to which the present invention pertains.

Therefore, the technical spirit of the present invention should not be determined based on only the described embodiments, and the following claims, all equivalent to the claims and equivalent modifications should be construed as falling within the scope of the spirit of the present invention.

What is claimed is:

1. A method of correcting ionospheric distortion of an SAR (Synthetic Aperture Radar) interferogram, comprising:
    imaging a target using a SAR sensor that radiates a beam a portion of which is directed toward the target,
    producing an SAR interferogram using photographed data obtained by the SAR sensor as a result of the imaging of the target;
    generating, by a processor, a multiple aperture SAR interferometry (MAI) interferogram using the SAR interferogram;
    generating, by the processor, a transformed MAI interferogram representative of azimuth direction derivatives of ionospheric distortion phases using phases of the MAI interferogram;
    generating, by the processor, an ionospheric distortion interferogram using the transformed MAI interferogram; and
    acquiring, at the processor, a corrected SAR interferogram by eliminating the generated ionospheric distortion interferogram from the SAR interferogram.

2. The method of claim 1, further comprising, after the generating of the MAI interferogram, registering, by the processor, a location of the SAR interferogram with a location of the MAI interferogram;
    wherein the generating of the transformed MAI interferogram comprises generating, by the processor, the phases of the MAI interferogram using azimuth direction derivatives of phases of the SAR interferogram.

3. The method of claim 1, wherein the generating of the MAI interferogram comprises generating, by the processor, the MAI interferogram using phase differences between forward-looking interferogram and backward-looking radar interferogram of the SAR interferogram.

4. The method of claim 3, wherein the generating of the MAI interferogram comprises:
    generating, by the processor, a forward-looking SAR image by compressing data obtained by an SAR sensor imaging a single target from a front direction of a center of a beam;
    generating, by the processor, the forward-looking radar interferogram from phase differences calculated after observing the forward-looking SAR image twice; and
    generating, by the processor, a backward-looking SAR image by compressing data obtained by the SAR sensor imaging the single target from a backward direction of the center of the beam;
    generating, by the processor, the backward-looking radar interferogram from phase differences calculated after observing the backward-looking SAR image twice.

5. The method of claim 1, wherein the generating of the ionospheric distortion interferogram comprises generating, by the processor, the ionospheric distortion interferogram by integrating the transformed MAI interferogram along an azimuth direction.

6. The method of claim 5, wherein the generating of the ionospheric distortion interferogram comprises:
    generating an initial ionospheric distortion interferogram on the assumption that an integral constant is 0;
    generating an error interferogram from differences between the SAR interferogram and the initial ionospheric distortion interferogram;
    obtaining an average of the error interferogram in the azimuth direction, and calculating an initial integral constant along a range direction;
    finding a discontinuous location from the initial integral constant, and calculating a correction integral constant; and
    adding the correction integral constant to the initial ionospheric distortion interferogram.

7. The method of claim 5, wherein the generating of the ionospheric distortion interferogram comprises performing integration, by the processor, using an integral constant determined on the assumption that there is a correlation between the SAR interferogram and the ionospheric distortion interferogram.

8. A non-transitory computer-readable medium containing program instructions that, when executed by a processor, causes the processor to execute a method of correcting ionospheric distortion of an SAR (Synthetic Aperture Radar) interferogram, comprising:
    program instructions that produce an SAR interferogram using photographed data of a target;
    program instructions that generate a multiple aperture SAR interferometry (MAI) interferogram using the SAR interferogram;
    program instructions that generate a transformed MAI interferogram representative of azimuth direction derivatives of ionospheric distortion phases using phases of the MAI interferogram;
    program instructions that generate an ionospheric distortion interferogram using the transformed MAI interferogram; and program instructions that acquire a corrected SAR interferogram by eliminating the generated ionospheric distortion interferogram from the SAR interferogram, wherein a SAR sensor radiates a beam a portion of which is directed toward the target images the target and thereby generates the photographed data of the target.

9. An apparatus for correcting ionospheric distortion of an SAR (Synthetic Aperture Radar) interferogram, comprising a processor configured to:

produce an SAR interferogram using photographed data of a target;

generate a multiple aperture SAR interferometry (MAI) interferogram using the SAR interferogram;

generate a transformed MAI interferogram representative of azimuth direction derivatives of ionospheric distortion phases using phases of the MAI interferogram;

generate an ionospheric distortion interferogram using the transformed MAI interferogram; and acquire a corrected SAR interferogram by eliminating the generated ionospheric distortion interferogram from the SAR interferogram, wherein a SAR sensor radiates a beam a portion of which is directed toward the target images the target and thereby generates the photographed data of the target.

10. The apparatus of claim 9, wherein the processor is further configured to:

register a location of the SAR interferogram with a location of the MAI interferogram; and generate the phases of the MAI interferogram using azimuth direction derivatives of phases of the SAR interferogram.

11. The apparatus of claim 9, wherein the processor is further configured to:

generate a forward-looking radar interferogram and a backward-looking radar interferogram; and generate the MAI interferogram using phase differences between the forward-looking interferogram and backward-looking radar interferogram.

12. The apparatus of claim 11, wherein the processor is further configured to:

generate a forward-looking SAR image by compressing data obtained by an SAR sensor imaging a single target from a front direction of a center of a beam;

generate the forward-looking radar interferogram from phase differences calculated after observing the forward-looking SAR image twice;

generate a backward-looking SAR image by compressing data obtained by the SAR sensor imaging the single target from a backward direction of the center of the beam; and generate the backward-looking radar interferogram from phase differences calculated after observing the backward-looking SAR image twice.

13. The apparatus of claim 9, wherein the processor is further configured to generate the ionospheric distortion interferogram by integrating the transformed MAI interferogram along an azimuth direction.

14. The apparatus of claim 13, wherein the processor is further configured to:

generate an initial ionospheric distortion interferogram on the assumption that an integral constant is 0;

generate an error interferogram from differences between the SAR interferogram and the initial ionospheric distortion interferogram;

obtain an average of the error interferogram in the azimuth direction, and calculate an initial integral constant along a range direction;

find a discontinuous location from the initial integral constant, and calculate a correction integral constant; and add the correction integral constant to the initial ionospheric distortion interferogram, thereby generating the ionospheric distortion interferogram.

15. The apparatus of claim 13, wherein the processor is further configured to perform integration using an integral constant determined on the assumption that there is a correlation between the SAR interferogram and the ionospheric distortion interferogram.

* * * * *